(12) United States Patent
Skiles et al.

(10) Patent No.: US 7,621,701 B2
(45) Date of Patent: Nov. 24, 2009

(54) SELF-RETAINING SHIM FOR USE WITH A CONTOURED MACHINING TEMPLATE

(75) Inventors: David W. Skiles, St. Peters, MO (US); James L. Morrison, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 11/138,104

(22) Filed: May 26, 2005

(65) Prior Publication Data
US 2006/0269368 A1  Nov. 30, 2006

(51) Int. Cl.
*B23B 35/00* (2006.01)
(52) U.S. Cl. .......................... 408/1 R; 24/67.9; 24/545; 24/555; 24/570; 29/464; 206/449; 408/103
(58) Field of Classification Search ............... 408/1 R, 408/3, 97, 115 R, 72 R, 103; 144/2.1, 3.1, 144/144.1, 144.51, 144.52, 145.1, 253.1; 33/561.3, 638, 626, 628, 561.1, 561.2, 562, 33/566; 409/178, 179, 131–132; 24/67.9, 24/67.11, 487, 545, 547, 555, 570; 403/286, 403/292, 293, 397; 29/897.2, 464, 468, 448; 206/449, 455, 456, 565
See application file for complete search history.

(56) References Cited

U.S. PATENT DOCUMENTS

| | | | | | |
|---|---|---|---|---|---|
| 1,044,071 | A | * | 11/1912 | Mulvihill | 408/97 |
| 1,417,009 | A | * | 5/1922 | Woodward | 223/91 |
| 1,468,884 | A | * | 9/1923 | Schneider | 24/501 |
| 2,231,883 | A | * | 2/1941 | Caccivio | 211/32 |
| 2,492,028 | A | * | 12/1949 | Bauer | 24/11 P |
| 2,521,604 | A | * | 9/1950 | Provost | 248/316.3 |
| 2,523,785 | A | * | 9/1950 | Sereno | 403/188 |
| 2,671,967 | A | * | 3/1954 | Del Giudice | 33/561.3 |
| 2,987,841 | A | * | 6/1961 | Phillips | 40/658 |
| 3,348,272 | A | * | 10/1967 | Germani | 24/563 |
| 3,395,428 | A | * | 8/1968 | Schnabel | 24/67.11 |
| 3,434,686 | A | * | 3/1969 | Aoi | 248/316.3 |
| 3,797,076 | A | * | 3/1974 | Watkin | 24/562 |
| 4,027,992 | A | * | 6/1977 | Mackey et al. | 408/97 |
| 4,085,848 | A | * | 4/1978 | Tsuge | 211/45 |
| 4,195,862 | A | | 4/1980 | Specktor et al. | |
| 4,226,006 | A | * | 10/1980 | Toyama | 24/3.12 |
| 4,232,068 | A | | 11/1980 | Hoh et al. | |
| 4,306,823 | A | * | 12/1981 | Nashlund | 408/26 |

(Continued)

FOREIGN PATENT DOCUMENTS

DE    702918 A  *  2/1941

*Primary Examiner*—Daniel W Howell

(57) ABSTRACT

Self-retaining shim apparatus and methods for providing an offset surface for supporting a template above a contoured workpiece such as the frame of an aircraft are disclosed. In one embodiment, an apparatus includes a shim portion of substantially uniform thickness, and one or more biasing members secured to the distal end thereof and extending toward the proximal end. A work piece is positioned between the biasing member and shim portion such that the biasing members are elastically deformed, resulting in a restoring force exerted on the workpiece serving to retain the shim in engagement with the workpiece. Contact pads secure to the free ends of the biasing members and have a contact portion offset from the free end. The contact portion is rounded to facilitate mounting and retention of the self-retaining shim.

12 Claims, 6 Drawing Sheets

U.S. PATENT DOCUMENTS

| | | | |
|---|---|---|---|
| 4,330,228 A * | 5/1982 | Beyl | 408/112 |
| 4,397,577 A * | 8/1983 | Bauer | 402/19 |
| 4,432,538 A * | 2/1984 | Sequin | 269/92 |
| 4,506,416 A * | 3/1985 | Ohminato et al. | 24/67 R |
| 4,601,618 A * | 7/1986 | McEldowney | 408/1 R |
| 4,710,992 A * | 12/1987 | Falwell et al. | 5/663 |
| 4,766,653 A * | 8/1988 | Della Porta | 24/563 |
| 4,813,826 A * | 3/1989 | Riedel | 408/108 |
| 4,823,920 A | 4/1989 | Evans | |
| 4,908,245 A | 3/1990 | Shah et al. | |
| 4,908,912 A * | 3/1990 | Grant | 24/67.11 |
| 5,114,285 A * | 5/1992 | Brydon | 408/115 R |
| 5,214,825 A * | 6/1993 | Hirzel | 24/67.9 |
| 5,305,500 A * | 4/1994 | Tucker | 24/30.5 R |
| 5,318,394 A * | 6/1994 | Pierce et al. | 408/72 B |
| 5,404,602 A * | 4/1995 | Kondo | 5/504.1 |
| 5,495,644 A * | 3/1996 | Mesher et al. | 24/3.12 |
| 5,509,508 A | 4/1996 | Evans | |
| 5,624,724 A | 4/1997 | Relly | |
| 5,697,131 A * | 12/1997 | Hunt et al. | 24/563 |
| 5,738,468 A | 4/1998 | Boianjiu | |
| D405,828 S * | 2/1999 | Richter | D19/65 |
| 6,018,850 A * | 2/2000 | Lorber | 24/67.9 |
| 6,073,318 A * | 6/2000 | Phillips | 24/499 |
| 6,205,222 B1 * | 3/2001 | Carpenter | 379/446 |
| 6,352,229 B1 * | 3/2002 | Adams | 248/316.7 |
| 6,430,782 B1 * | 8/2002 | Torres et al. | 24/3.1 |
| 6,457,218 B1 * | 10/2002 | Lawrence | 24/563 |
| 7,052,045 B2 * | 5/2006 | Park | 281/36 |
| 2005/0025587 A1 * | 2/2005 | Xiao | 408/115 R |
| 2005/0072701 A1 * | 4/2005 | Allan et al. | 206/373 |

* cited by examiner

SELF-RETAINING SHIM FOR USE WITH A CONTOURED MACHINING TEMPLATE

FIELD OF THE INVENTION

This invention relates generally to shims for offsetting machining templates from workpieces and more specifically, to apparatus and methods for securing shims to workpieces.

BACKGROUND OF THE INVENTION

A typical aircraft is clad with a thin skin, usually of aluminum, composite titanium, steel, or the like, fastened to a supporting frame. The supporting frame must be machined to receive fasteners securing the skin to the frame. However, inasmuch as the outer surface of an aircraft is typically rounded to reduce drag, machining the frame requires a specially formed template to aid in correctly positioning machining tools operating on the frame.

In prior manufacturing methods, shims are fastened to the frame prior to positioning the template over the frame. The shims serve as a temporary substitute for the skin and ensure that the template is properly aligned and offset from the frame, such that when the skin is put in place, apertures and the like machined in the frame will be aligned with apertures and other features formed in the skin.

In prior systems, the shims are fastened to the frame using adhesive tape. However, in a large scale mass manufacturing processes, the step of taping a number of shims to a frame member each time a member is drilled is time consuming and costly. Furthermore, the adhesive tape must be removed from the substructure and from the shim if it is to be reused, requiring additional time and labor. Thus, although desirable results have been achieved using such prior art systems and methods, there is room for improvement.

SUMMARY OF THE INVENTION

The present invention comprises systems and methods for providing an offset surface for supporting a machining template above a contoured workpiece, such as the frame of an aircraft. The offset typically corresponds to a skin subsequently secured to the workpiece. The offset surface is defined by one or more self-retaining shims securing to the workpiece. In one method for using the shim, at least two shims are used. The self-retaining shim has a substantially planar shim portion and one or more biasing members. The shim portion typically has a substantially uniform thickness approximately equal that of the skin to be secured to the workpiece.

The biasing members secure to the distal end of the shim portion and extend toward the proximal end thereof. The free ends of the biasing members are positioned over the shim portion and spaced apart therefrom. In operation, a workpiece is forced between the biasing member and shim portion such that the biasing members are elastically and resiliently deformed resulting in a restoring force exerted on the workpiece and serving to retain the shim in engagement with the workpiece.

Contact pads secure to the free ends of the biasing members and have a contact portion offset toward the shim portion from the free ends. The contact portion is rounded to facilitate insertion of the workpiece between itself and the shim portion. The rounded contact portion may also provide a surface having a normal vector oriented perpendicular to the surface of the workpiece such that the restoring force exerted on the workpiece is likewise perpendicular to the surface of the workpiece.

BRIEF DESCRIPTION OF THE DRAWINGS

Preferred and alternative embodiments of the present invention are described in detail below with reference to the following drawings.

DETAILED DESCRIPTION

The present invention relates to systems and methods for providing an offset surface for supporting a machining template above a contoured workpiece, such as the frame of an aircraft. Many specific details of certain embodiments of the invention are set forth in the following description and in FIGS. 1-6 to provide a thorough understanding of such embodiments. The present invention may have additional embodiments, or may be practiced without one or more of the details described for any particular described embodiment.

Figure 1:
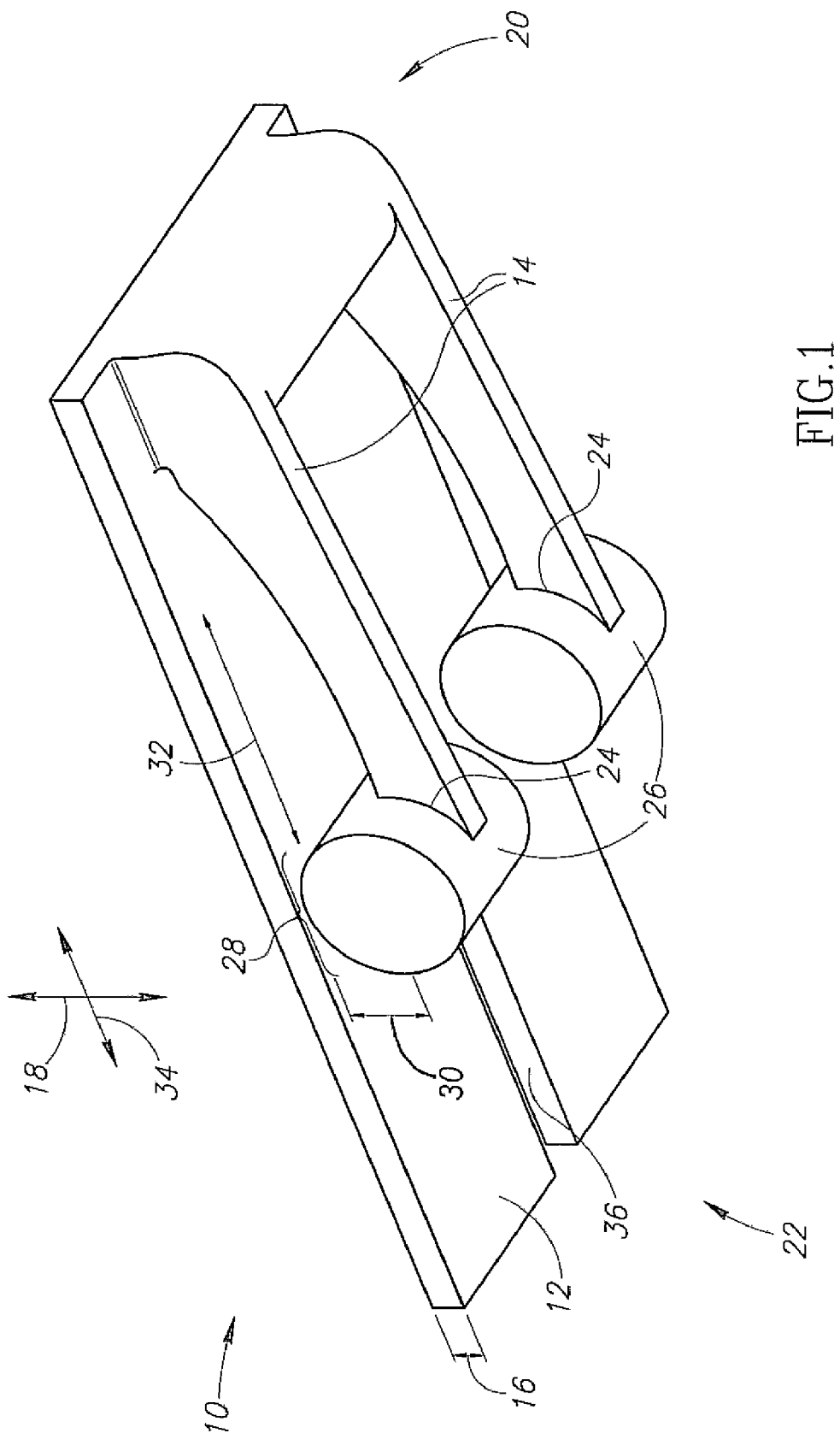
FIG. 1 is a perspective view of a self-retaining shim in accordance with an embodiment of the present invention.

Referring to FIG. 1, a self-retaining shim 10 in accordance with an embodiment of the invention may include a shim portion 12 and one or more biasing members 14. The shim portion 12 typically may have a uniform thickness 16 in a direction 18, and may be substantially flat or contoured. The biasing members 14 secure to the shim portion 12 and serve to capture a workpiece (not shown) between the biasing members 14 and the shim portion 12. The biasing members 14 are typically elastically deformable to permit insertion of the workpiece between the biasing members 14 and the shim portion 12. In the illustrated embodiment, two biasing members 14 are used. In some applications, members, such as webs for supporting flanges, extend vertically from the surface of the workpiece. Accordingly, having two biasing members 14 enables the biasing members 14 to straddle obstructing members.

The biasing members 14 may fasten to the shim portion 12 or be monolithically formed therewith, as in the illustrated embodiment. The shim portion 12 and biasing members 14 are typically formed of an elastic material that is sufficiently soft to avoid scratching the workpiece to which they secure. In the illustrated embodiment, the shim portion and biasing members are monolithically formed of nylon.

In the illustrated embodiment, the biasing members 14 secure near a distal end 20 of the shim portion 12 and extend toward a proximal end 22. Free ends 24 of the biasing members 14 may be positioned over the midpoint of the shim portion 12 or offset a small distance therefrom. Contact pads 26 may secure to the free ends 24 of the biasing members 14 and directly contact the workpiece. The contact pads 26 may have a contact portion 28 offset a distance 30 toward the shim portion 12 from the free ends 24. In some embodiments, the biasing members 14 may also be offset from the shim portion 12 along a distance 32 from the free ends 24 to permit insertion of a workpiece.

The contact portion 28 may be situated such that the point of contact of the contact portion 28 with the workpiece has a normal vector, which is close to perpendicular to the surface of the workpiece. For example, in the illustrated embodiment, the contact portion 28 has a contour approximating a circular arc in a plane parallel to the direction of uniform thickness 18 of the shim portion 12. Accordingly, any planar, or near planar, workpiece surface will tend to be perpendicular to the normal vector of the contact portion 28 at the point of contact with the workpiece.

The contour of the contact portion 28 (and the biasing members 14) may facilitate positioning the self-retaining shim 10 onto a workpiece. The shim 10 is typically fastened by sliding the shim 10 in an insertion direction 34 over the workpiece. In the illustrated embodiment, the contact portion 28 has an arcuate shape in the plane parallel to the insertion direction 34 and to the direction of uniform thickness 18 of the shim, the workpiece therefore encounters a curved surface during insertion that slides readily over corners and the like.

The shim portion 12 may have various sizes and shapes. In the illustrated embodiment, the shim portion 12 is rectangular in shape. A slit 36 may extend from the proximal end 22 toward the distal end 20, leaving a band of continuous material proximate the point of securement of the biasing member 14 to the shim portion 12. The slit 36 may serve to receive fixtures, machining tools or the like. The slit 36 also enhances flexibility of the shim portion 12, facilitating bending of the shim portion 12 to conform to contoured workpieces.

Figure 2:
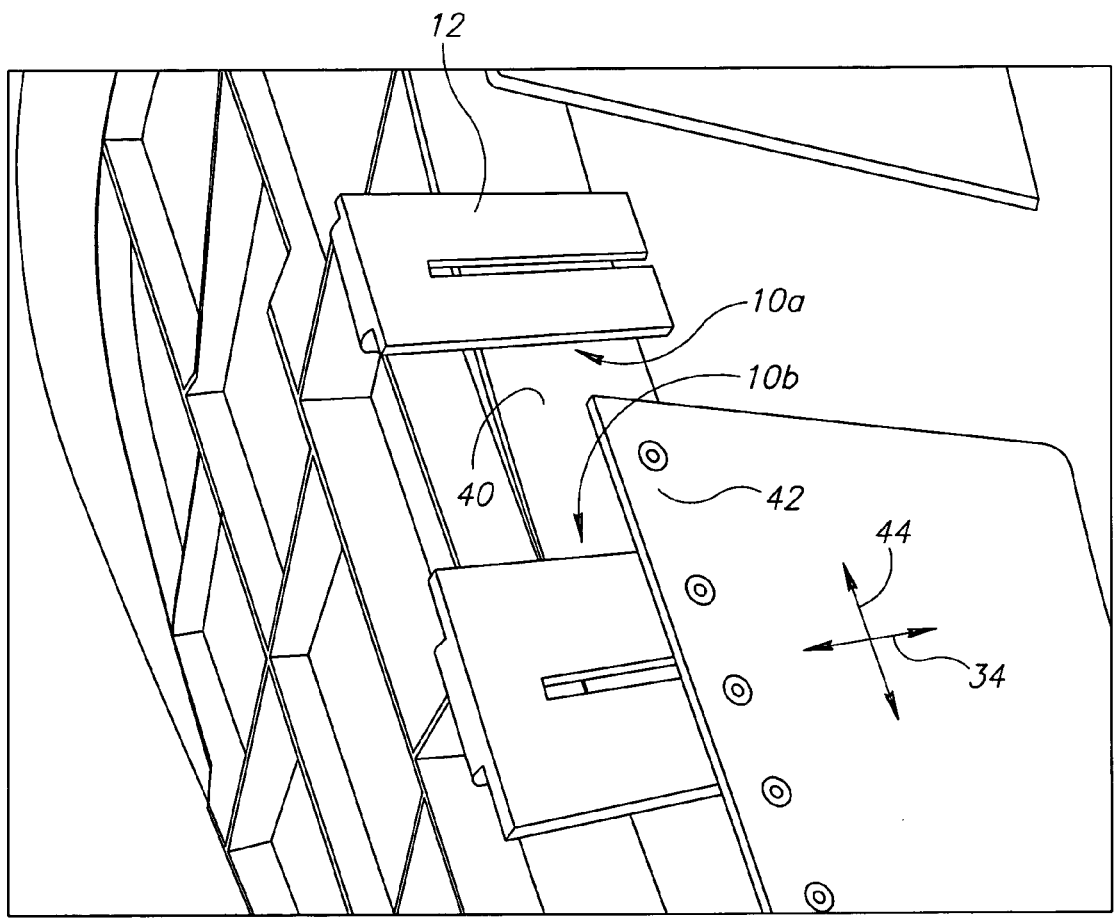
FIG. 2 is a perspective view of two embodiments of a self-retaining shim clip secured to a workpiece in accordance with an embodiment of the present invention.
Figure 3:
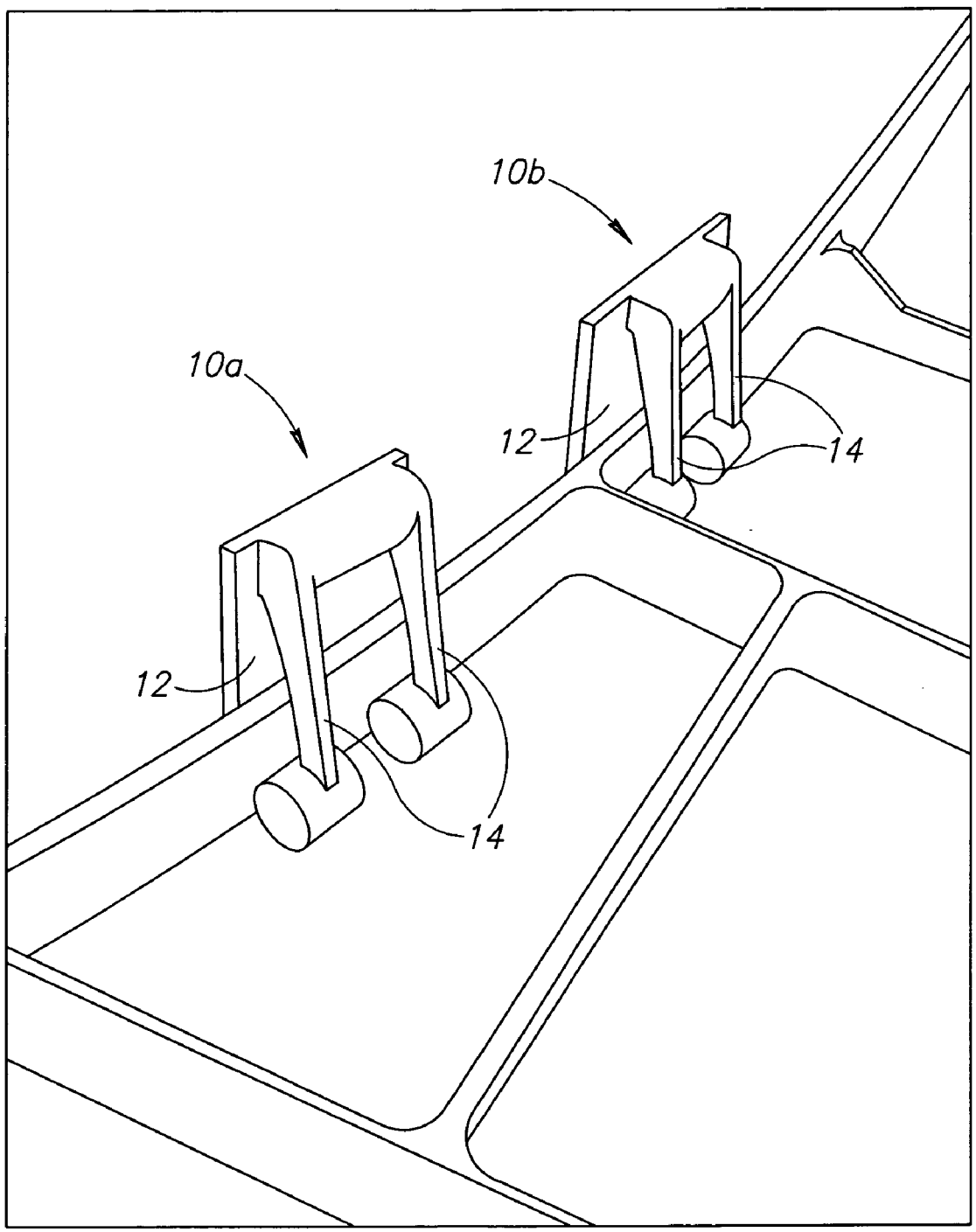
FIG. 3 is a lower quarter perspective view of self-retaining shim clips secured to a workpiece in accordance with an embodiment of the present invention.

Referring to FIGS. 2 and 3, a shim 10a, 10b may be positioned on a workpiece 40 as illustrated. The work piece 40 is typically contoured in at least one direction. The biasing members 14 typically deform elastically to permit the workpiece 40 to insert between the biasing members 14 and the shim portion 12. As shown by shim 10a, in some applications the shim portion 12 extends completely across the work piece. In other embodiments, a portion of a skin 42 of an airplane is fastened to the workpiece 40 in which case the shim portion 12 may extend partially across the workpiece and have the proximal end 22 thereof abutting the skin 42, as illustrated by shim 10b. The shim 10b may have a shim portion 12 substantially shorter along the direction of insertion 34 than the shim portion 12 of the shim 10a to accommodate the skin 42. The width of each shim portion 12 of the shims 10a, 10b may also be different along a lateral direction 44 to accommodate various working environments as desired.

Figure 4:
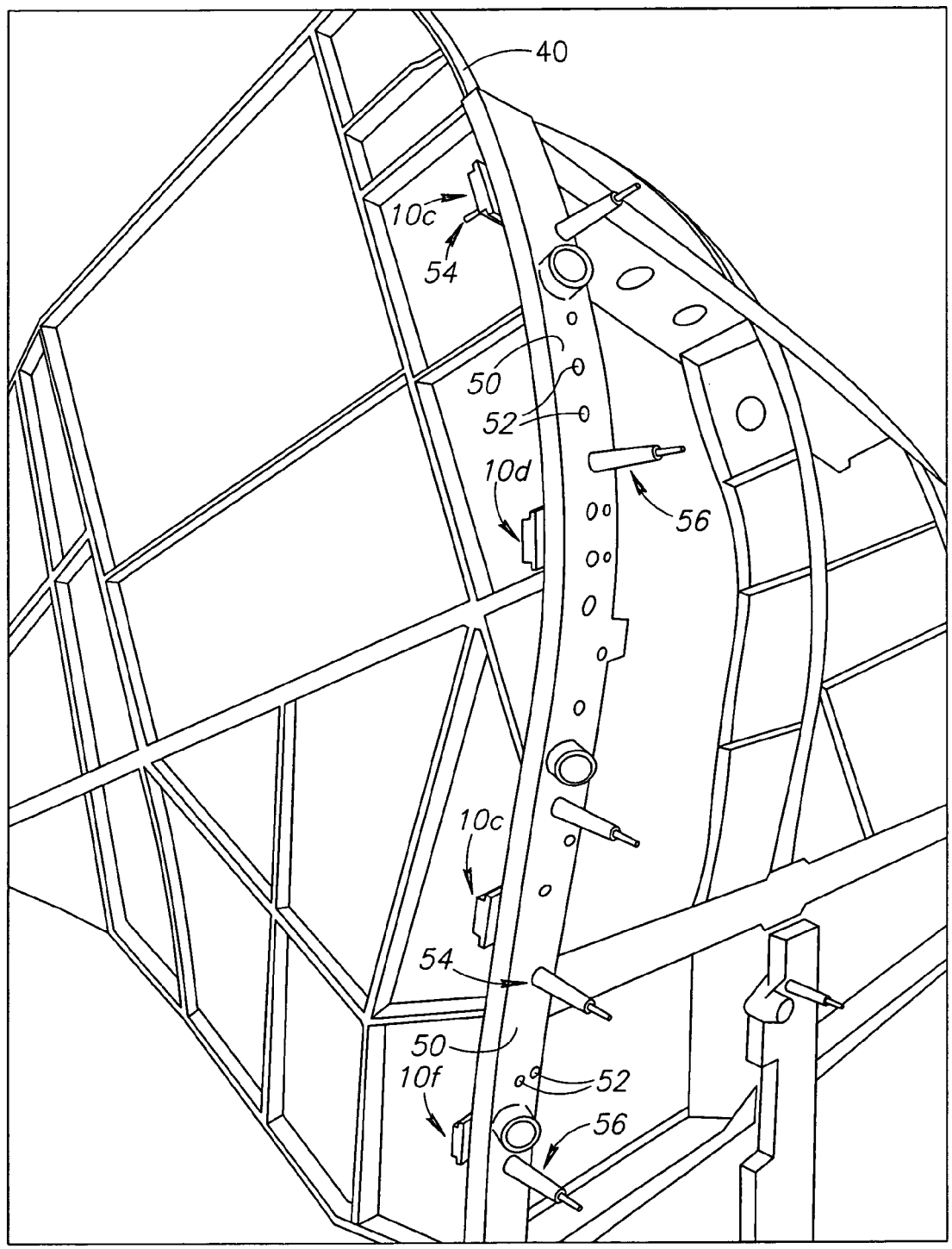
FIG. 4 is a perspective view of a machining template secured over self-retaining shims in accordance with an embodiment of the present invention.

Referring to FIG. 4, in operation, after one or more shims 10c-10f are engaged onto a workpiece, the shims 10c-10f may be overlain by one or more templates 50. The shims 10c-10f serve as placeholders, offsetting the templates 50 from the workpiece 40 a distance approximately equal to the thickness of the skin 42 that will eventually cover the workpiece. In this manner, the templates 50 can be aligned properly with the workpiece 40, ensuring that apertures formed in the workpiece 40 according to the template 50 will be aligned with apertures formed in the skin 42.

The template 50 typically defines locating apertures 52 designed to receive a drill, or other machining tool. The template 50 may also receive aligning pins 54, such as the illustrated "L" pins, having a shaft passing through the template 50 and engaging the edges of the workpiece 40 to align the template 50 therewith. In a like manner, retaining devices 56, such as "wedgelocks" may also pass through the template 50 and engage index holes formed in the workpiece in order to align the template 50 and press the template 50 against the workpiece 40 and shims 10c-10f. In some applications, the aligning pins 54 and retaining devices 56 may pass through the slit 32 formed in the shim portion 12. However in other applications, the aligning pins 54 or retaining devices 56 may simply pierce the shim portion 12 or be positioned on either side of the shim portion 12.

Figure 5:
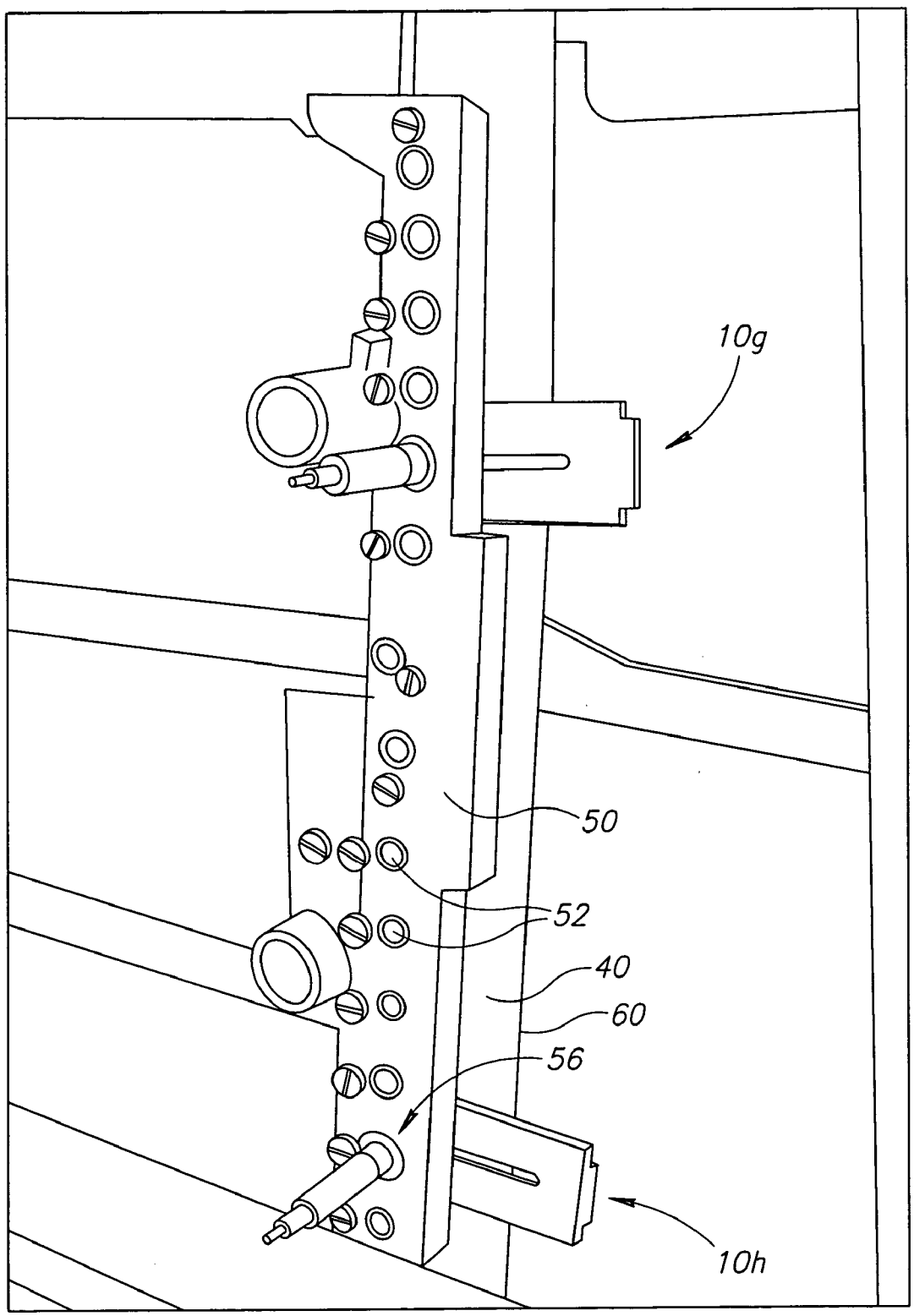
FIG. 5 is a perspective view of an alternate arrangement for a machining template and self-retaining shims in accordance with an embodiment of the present invention.

Referring to FIG. 5, the shim 10 may secure either to the edge of the workpiece 40 proximate the area being machined or it may secure to the opposite side of the workpiece 40 and extend there across to the side being subject to a machining operation. For example, in the arrangement of FIG. 5, the shims 10g, 10h have the distal ends 20 thereof positioned proximate the edge 60 of the workpiece 40, whereas the template 50 and proximal ends 22 of the shims 10g, 10h are located nearer the opposite edge. In contrast, in the arrangement of FIG. 4, the distal ends 20 of the shims 10c-10f and the template 50 are all located proximate the same edge of the workpiece 40.

Figure 6:
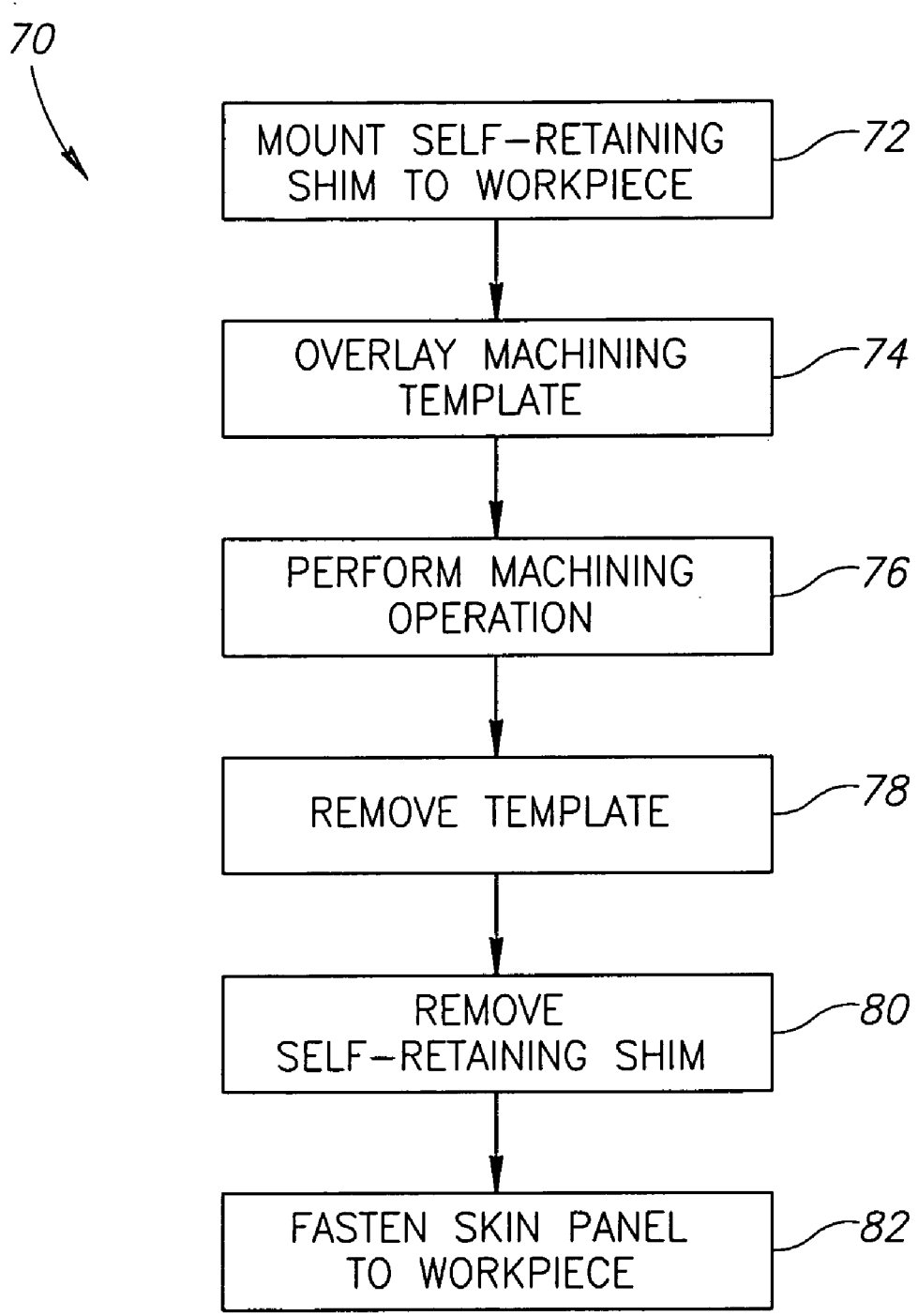
FIG. 6 is a process flow diagram of a method for using a self-retaining shim in accordance with the present invention.

Referring to FIG. 6, a method 70 for using the self-retaining shim 10 in accordance with an embodiment of the invention may include mounting the self-retaining shim to a workpiece at a block 72, and overlying the shim 10 with a machining template at a block 74. Overlaying the shim 10 in block 74 may also include inserting alignment pins 54, retaining devices 56, or both to align the workpiece 40 with the template 50 and retaining the template 50. A machining operation, such as an indexed machining operation, is performed on the workpiece at a block 76. At a block 78, the template is removed, and the self-retaining shim is removed at a block 80. Finally, a skin panel is fastened to the workpiece at a block 82.

Mounting the self-retaining shim 10 to the work piece (block 72) may include forcibly sliding the shim 10 over the workpiece 40 such that the biasing members 14 are forced away from the shim portion 12 by the workpiece 40. The elastic restoring force of the biasing members 14 ensures that friction forces between the workpiece 40 and the shim portion 12 and biasing members 14 will retain the shim 10. Mounting the self-retaining shim 10 may be repeated for multiple shims 10 sufficient to define an offset contoured surface to support the template 50.

Overlying the shim 10 with a machining template (block 74) may include securing a template 50, such as a DRT, to the workpiece 40 over the shim portions 12. The overlaying of the template 50 typically includes aligning the template 50 with respect to reference points defined by the workpiece 40. Aligning the template 50 with respect to reference points may be accomplished by inserting aligning pins 54 through the template 50 into engagement with the edges of the work piece and positioning retaining devices 56 within index holes provided for alignment purposes.

Performing a machining operation on the workpiece (block 76) may include performing an operation such as drilling, milling, welding, deburring, or any other suitable manufacturing operation or the like, on the workpiece 40 as guided by the template 50. For example, the template 50 may provide locating apertures 52 that receive a drill. Accordingly, performing a machining operation may include inserting a drill bit into the locating apertures 52 and drilling holes in the workpiece 40. In some embodiments, the holes drills are index holes for retaining a template during subsequent machining operations performed on the workpiece 40 and skin 42.

The template 50 may then be removed (block 78). The self-retaining shim 10 may also be removed (block 80) by simply sliding it off the workpiece 40. The self-retaining shim 10 may then be reused in subsequent machining operations. A skin panel 42 may secure (block 82) to the workpiece 40 after the self-retaining shim 10 is removed. In some embodiments, subsequent machining operations may be performed on the skin and workpiece. For example, the holes drilled in block 76 may be index holes that guide a drill that forms corresponding holes in the skin. The template 50, or a different template, may then be laid over the skin 42 and workpiece 40. The index holes formed in the skin 42 and workpiece 40 may receive retaining devices 56 to retain the template 50, or a different template.

The process 70 may be repeated on the same workpiece 40 to prepare the workpiece 40 to receive an additional skin panel 42. A specialized self-retaining shim 10 sized to abut the already fastened skin panel 42 may be used in such situations, as discussed hereinabove.

Embodiments of apparatus and methods in accordance with the present invention may provide significant advantages over the prior art. For example, because the inventive apparatus may be readily installed and removed, the need for adhesives or tape for mounting a shim is eliminated, reducing labor and expense in comparison with the prior art. The inventive shims are also more readily reusable, and do not require extensive cleaning (e.g. tape removal), thereby further reducing labor and expense. Finally, shim apparatus in accordance with the present invention may be relatively inexpensive to manufacture.

While preferred and alternate embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An assembly for performing a manufacturing operation on a workpiece having a first surface and a second surface opposite from the first surface, comprising:
   at least one self-retaining shim adapted to be secured to the workpiece, the self-retaining shim comprising
      a shim portion having a first end portion and a second end portion, the shim portion being adapted to be engageable with the first surface of the workpiece, the shim portion being of about uniform overall thickness; and
      at least one elongated biasing member secured to the shim portion proximate the first end portion and extending toward the second end portion, the biasing member terminating in a solid cylindrical portion supported in non-contacting overlying adjacency to the shim portion, the biasing member being adapted to be positioned proximate the second surface and to capture the workpiece between the shim portion and the biasing member; and
   a template adapted to overlay the shim portion of the self-retaining shim, the template having a lower surface engageable with and having a contour substantially equivalent to an upper surface of the shim portion;
   uniform overall thickness of the shim portion being approximately equal to thickness of a skin panel that will subsequently be secured to the first surface of the workpiece.

2. The assembly of claim 1, wherein the biasing member is adapted to resiliency urge the cylindrical portion into engagement with the second surface of the workpiece.

3. The assembly of claim 1, wherein the shim portion defines a slit extending from the second end toward the first end.

4. The assembly of claim 1, wherein the biasing member and shim portion of the self-retaining shim are monolithically formed.

5. The assembly of claim 1, the skin panel having an edge thereof abutting the second end of the shim portion.

6. The assembly of claim 1, wherein the self-retaining shim further comprises a second biasing member spaced apart from the at least one biasing member and secured to the shim portion proximate the first end and extending toward the second end thereof, the second biasing member being adapted to be positioned proximate the second surface and to capture the workpiece between the shim portion and the second biasing member.

7. A method for using a self-retaining shim, comprising:
   providing a self-retaining shim comprising a shim portion and a biasing member, the biasing member having a distal end secured to the shim portion and a proximal end terminating in a solid cylindrical member having a contact pad portion spaced apart from the distal end and supported in non-contacting adjacency over the shim portion;
   providing a work piece having an upper surface and a lower surface;
   providing a template;
   engaging the self-retaining shim with the work piece such that the shim portion is positioned on the upper surface and the biasing member is in engagement with the lower surface;
   engaging the template over the self-retaining shim;
   performing a manufacturing operation on the workpiece guided by the template; and
   fastening a skin panel having a thickness about equal to a uniform thickness of the shim portion to the upper surface of the workpiece.

8. The method of claim 7, further comprising:
   removing the template; and
   removing the self-retaining shim.

9. The method of claim 8, wherein performing a machining operation comprises forming a reference aperture in the workpiece, the method further comprising machining the skin panel guided by the reference aperture.

10. The method of claim 9, further comprising
    laying the template over the skin panel;
    positioning a retaining device within the reference aperture; and
    machining the skin panel and workpiece guided by the template.

11. The method of claim 7, further comprising providing a skin panel having substantially uniform thickness secured to the upper surface; and wherein engaging the self-retaining shim into engagement with the workpiece includes abutting the shim portion against the skin panel.

12. The method of claim 7, wherein performing a manufacturing operation on the workpiece guided by the template comprises performing at least one of a drilling operation, a milling operation, a welding operation, and a deburring operation.

* * * * *